Patented Nov. 8, 1932

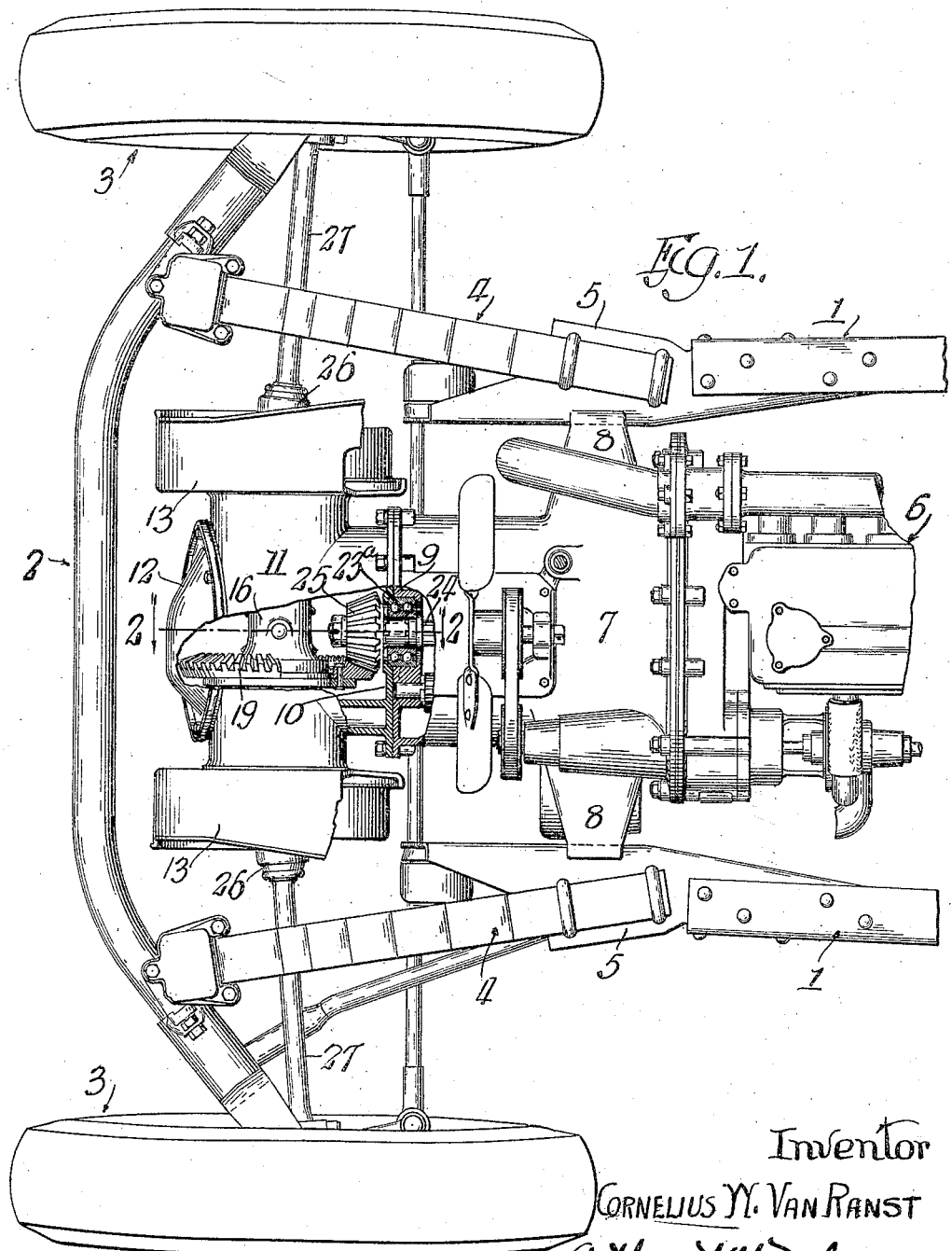

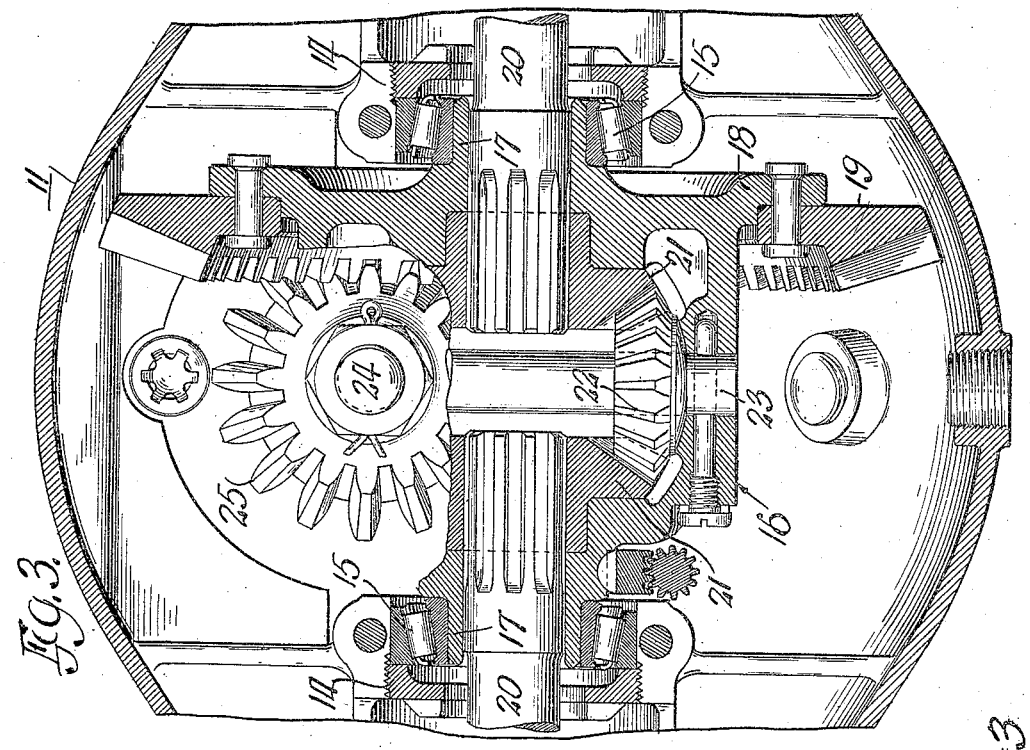
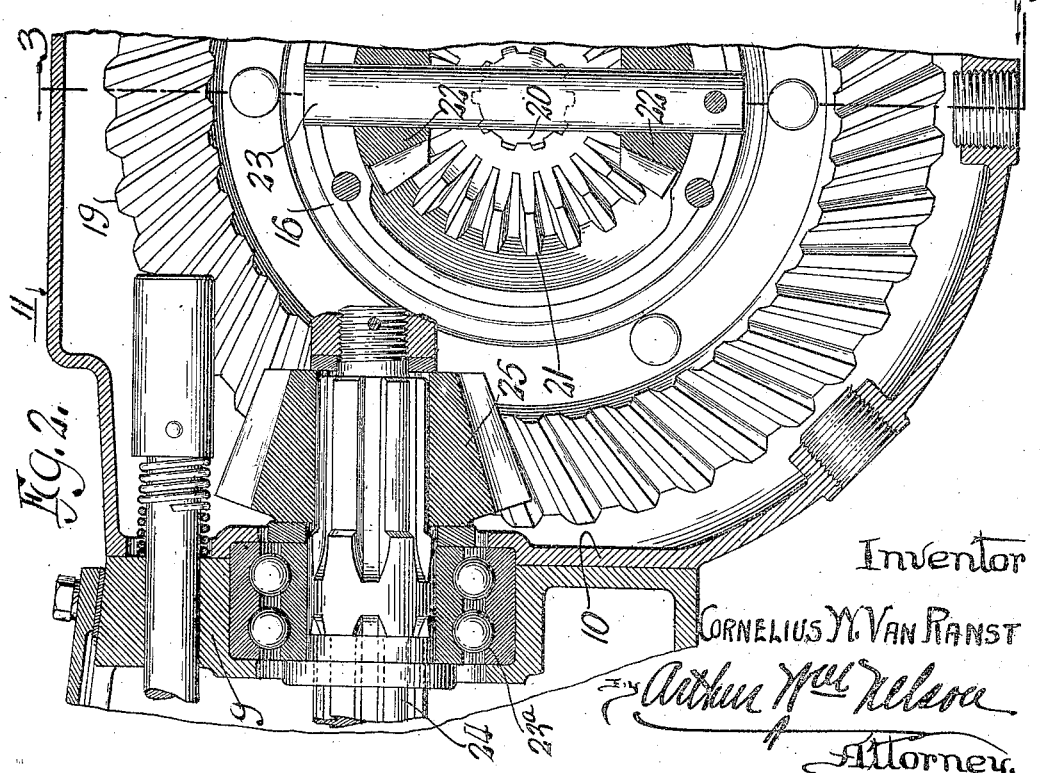

1,886,924

UNITED STATES PATENT OFFICE

CORNELIUS W. VAN RANST, OF AUBURN, INDIANA, ASSIGNOR, BY MESNE ASSIGNMENTS, TO MANNING & CO., OF CHICAGO, ILLINOIS, A CORPORATION OF ILLINOIS

DRIVING GEAR ARRANGEMENT FOR AUTOMOBILES

Application filed March 9, 1929. Serial No. 345,794.

This invention relates to improvements in a driving gear arrangement for automobiles and it consists of the matters hereinafter described and more particularly pointed out in the appended claim.

The primary object of the invention is to provide a driving gear of the kind above mentioned, which will provide a low center of gravity for the automobile without the sacrifice of road clearance.

Another object of the invention is to so arrange the several parts of the driving gear that the driving pinion of the differential is disposed in a plane above that of the axis the ring gear thereof, the latter being of the hypoid type.

Still another object of the invention is to provide a gear drive of this kind which is especially adapted for use in a front driven automobile and one which readily lends itself to easy assembly and at the same time is strong and durable and does not readily get out of adjustment.

These objects of the invention, as well as others together with the many advantages thereof, will more fully appear as I proceed with my specification.

In the drawings:

Fig. 1 is a view in plan elevation of the forward end of a front driven automobile, embodying my improved driving gear arrangement with the radiator omitted and with parts shown as broken away to more clearly disclose such arrangement.

Fig. 2 is a longitudinal vertical sectional view through the differential gearing and driving pinion, on an enlarged scale as taken on the line 2—2 of Fig. 1.

Fig. 3 is a transverse vertical sectional view through the differential gearing as taken on the line 3—3 of Fig. 2.

The invention is herein shown and will be herein described as embodied in the driving gear of a front driven automobile but as will be apparent, the invention is also adapted for use in other instances where the peculiar characteristics thereof make it of advantage to do so.

In general the invention contemplates the provision of a differential at the front end of the automobile including a ring gear of the hypoid type driven by a bevel pinion disposed to the rear and above the axis of the ring gear, the latter gear being operatively connected in the manner of differential gear with the usual driven shaft sections, which in turn are connected by other shaft sections with the front wheels to drive the same.

Referring now in detail to that embodiment of the invention illustrated in the accompanying drawings: 1—1 indicate the side frame members of the chassis of a front driven automobile, 2 indicates the front axle thereof to which is operatively connected the driven wheels 3—3, and 4—4 indicates the springs connecting said axle with extensions 5—5 of said chassis side frame members.

6 indicates the engine of the automobile to the front end of which is secured the transmission casing 7 that includes side legs 8—8, one engaging with and being secured to each extension 5. To the front end wall 9 of the transmission casing is secured the rear end wall 10 of the differential casing 11 in a manner providing a rigid support for said differential casing which is located just to the rear of the axle 2. From the above, as taken in connection with Fig. 1, it is apparent that the engine is located but a substantially short distance to the rear of the differential and is separated therefrom only by the transmission casing.

At the front of the differential is provided a removable cover plate 12 and at each end of said casing is found a brake drum housing 13.

In the differential casing is provided laterally spaced annular bosses 14—14 each receiving an anti-friction bearing 15. Between said bosses is located a pinion supporting housing or cage 16 having end hub portions 17—17 each engaging in an associated bearing 15 as best shown in Fig. 3. Near one hub 17 of the housing 16 is formed a radial flange 18 to which a ring gear 19 of hypoid type is rigidly secured.

Extending through each hub 17 of the housing or cage 16 is a driven shaft 20, the inner ends of which are splined and are spaced a substantially short distance apart as best shown in Fig. 3. Fixed on each splined shaft end is a bevel pinion 21 and both of said pinions mesh with opposite sides of smaller differential pinions 22—22 journalled on a shaft 23 secured in the housing or cage 16 and arranged between the adjacent ends of the shafts 20—20 and disposed at a right angle thereto.

In the front wall 9 of the transmission casing is located an antifriction bearing 23ª for the driven shaft 24 of the transmission. This shaft extends longitudinally of the automobile and is disposed in the plane of the pinion shaft 23 of the differential as a whole and is located in a plane above that of the axis of the shafts 20—20 and ring gear 19 as best shown in Figs. 2 and 3. The bearing 23ª is held in position by the rear wall 10 of the differential casing and the extremity of the shaft 24 extends into said casing where it has splined to it a pinion 25 that meshes with and drives the ring gear.

The outer ends of the driven shafts 20—20 terminate in substantially the plane of the brake drum housings 13—13 and operatively connected to each shaft end as by suitable combined universal and slip joints 26 is a second shaft section 27 that drives an associated wheel 3.

Heretofore in rear wheel driven automobiles wherein a hypoid gear and pinion was employed in the differential, a long propeller shaft operatively connected by universal joints with the transmission, drove the pinion which was arranged with its axis below that of the ring gear. However, in a front wheel driven automobile, due to the substantially close proximity of the engine and transmission with reference to the differential, such an arrangement would be most impractical for many reasons. Under such conditions the propeller shaft, as the shaft 24 herein may be aptly termed, would have to extend at such a steep angle as to make it impossible to use universal joints therein, and again, the ring gear and pinion necessary would be indeed difficult if not impossible to make.

Therefore with my improved construction, the short propeller or drive shaft may be employed devoid of universal joints and is one wherein vibration and whip are eliminated. Again, the improved construction provides a low center of gravity without sacrificing road clearance and at the same time, reduces the number of necessary parts to a minimum.

Furthermore the construction readily lends itself to the employment of a hypoid type of ring gear which is noiseless in operation and has an increased load carrying capacity. In the ring gear and pinion as herein shown, the axial thrust on the forward drive of the pinion is directed away from the ring gear against the bearing 23ª and the contact on mating tooth surfaces is more intimate on the drive side.

While in describing the invention, I have referred in detail to the form, arrangement and construction of the various parts thereof, the same is to be considered illustrative of only one embodiment of the invention so that I do not wish to be limited thereto except as may be pointed out in the appended claim.

I claim as my invention:

A front drive automobile embodying therein a differential casing and a transmission casing, said casings being secured together in end to end engagement, gearing in said differential casing including a hypoid ring gear, a rigid non-jointed horizontally disposed driven shaft in the transmission casing arranged with its axis above that of said ring gear and having a part extending into the differential casing, an antifriction bearing for said shaft supported in the engaging ends of said casings and a hypoid pinion fixed to that part of said shaft within the differential casing and meshing with the ring gear in a plane between the horizontal plane through the axis of such ring gear and its top peripheral portion.

In testimony whereof, I have hereunto set my hand, this 6th day of March, 1929.

CORNELIUS W. VAN RANST.